Patented Sept. 14, 1937

2,092,796

UNITED STATES PATENT OFFICE 2,092,796

AZO DYES AND PIGMENTS DERIVED THEREFROM

Crayton K. Black, Wilmington, Del., assignor to E. I. du Pont de Nemours & Company, Wilmington, Del., a corporation of Delaware No Drawing. Application November 2, 1935, Serial No. 48,047

12 Claims. (Cl. 260—86)

This invention relates to azo dyes, pigments made therefrom, and to processes of making the new products.

In 1915 the patent identified as Desamari, 1,126,413, January 26, 1915 issued, claiming a dye made from a diazotized aniline and aceto-acetic-anilid-para-carboxylic acid. Those compounds had some utility but exhibited a tendency to fade when exposed to light. This tendency is demonstrated by the fading, when exposed to light, of the colors when included in a lithographic varnish as pigments.

It is an object of this invention to prepare an azo dyestuff and its alkaline earth salts having superior light fastness and excellent applicability, for instance to wool. Another object of the invention is to produce new pigments of great strength and fastness to light. Another object of the invention is to produce pigments which are non-bleeding in rubber, but that invention is considered independent and is claimed in my copending application filed of even date herewith.

The objects of this invention are accomplished by coupling the diazonium salt of a negatively substituted anilide to aceto-acet-anilide-ortho-carboxylic acid, and by forming the heavy metal salts thereof.

In the practice of my invention the negatively substituted, diazotized aniline is the first, or azo, component. The term "negatively substituted" will be understood by persons skilled in the art, but as examples of negative substitutes there are cited the halogen, the nitro, the carboxylic acid, and the sulfonic acid groups. Specific examples of such azo components are given elsewhere herein.

The coupling component used in the formation of my new products is aceto-acet-anilide-ortho-carboxylic acid. The use of this coupling component produces results greatly superior to the para compound in that the dyes are more light-fast, form pigments of greater strength, and do not bleed when used for the coloring of rubber.

This invention is illustrated but not limited by the following examples in which the parts are by weight.

Example I 7.6 parts of 3-nitro-4-amino-toluene were diazotized by mixing with 100 parts of water and 4 parts of 100% hydrochloric acid, icing to 0° C., and adding 3.45 parts of sodium nitrite. When diazotization was complete the soluble diazo was filtered off.

12 parts of acetoacetanilide-ortho-carboxylic acid (aceto acetyl anthranilic acid) was dissolved in 125 parts of water at 50° C. containing 2.15 parts of sodium hydroxide, 10 parts of solid sodium acetate crystals were added, and the solution was made acid to blue litmus by the admixture of 1.9 parts of 100% hydrochloric acid.

The diazo body was admixed with the acetoacetanthranilic acid at 20° C. during 30 minutes, the mixture was agitated one hour and the dye was isolated by filtration. Wool was immersed in a water solution of the color containing sufficient sodium carbonate to make the solution slightly alkaline to brilliant yellow paper, and was dyed a bright yellow shade, the ordinary technique being employed.

The dye in the form of its sodium salt is represented by the formula:

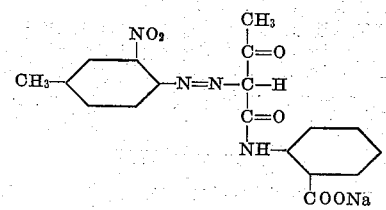

Example II

The dye described in Example I in the form of its free acid was dissolved in 3000 parts of water at 80° C. containing approximately 3 parts of sodium hydroxide, and 10 parts of calcium chloride in 100 parts of water were added. The insoluble calcium salt of the dye precipitated, and was isolated by filtration, washed free of chlorides and dried at 45° C. It was a bright yellow powder which dissolved in concentrated sulfuric acid to give an orange solution. When ground into linseed oil it produced a bright, yellow, strong, non-bleeding ink of excellent light fastness. When milled into rubber a bright yellow color, which did not migrate into adjacent white rubber, was produced.

Example III 10 parts of barium chloride were substituted for the 10 parts of calcium chloride in Example II. The resulting pigment was a bright yellow powder which dissolved in concentrated sulfuric acid to give an orange solution. In ink and rubber it was slightly weaker than the pigment of Example II, but showed neither migration in rubber, nor bleeding in oil.

Example IV 10 parts of strontium chloride were substituted for the 10 parts of calcium chloride in Example II. The resulting pigment was a bright yellow powder which dissolved in concentrated sulfuric acid to give an orange solution. It was slightly redder in shade than the pigment of Example II, and had properties of equal excellence.

Example V 10 parts of lead acetate were substituted for the 10 parts of calcium chloride in Example II. The resulting pigment was an orange yellow in color and dissolved in concentrated sulfuric acid to give an orange solution. It was redder in shade than the pigment of Example II and could not be used as a rubber color as the lead reacts with the sulfur present to form black lead sulfide. Otherwise its properties were excellent.

Example VI 6.35 parts of ortho-chlor-aniline were substituted for the 7.6 parts of 3-nitro-4-amino-toluene in Example I, and the dye was converted to the calcium salt as in Example II. The resulting pigment was a yellow powder which dissolved in concentrated sulfuric acid to give a greenish yellow solution. It is a very green shade of yellow, exhibits no migration in rubber, and has the formula:

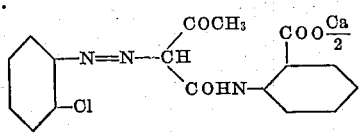

Example VII 6.85 parts of anthranilic acid were substituted for the 6.35 parts of ortho-chlor-aniline in Example VI. The resulting pigment was a bright yellow powder which dissolved in concentrated sulfuric acid to produce a medium yellow solution. In ink and rubber it is a strong yellow color which does not bleed.

Example VIII 8.6 parts of 4-chlor-2-nitro-aniline were substituted for the 6.35 parts of ortho-chlor-aniline in Example VI. The resulting pigment was a yellow powder which dissolved in concentrated sulfuric acid to give a yellow orange solution, and in oil produced a strong, bright-green, shade of yellow of excellent light fastness. In rubber it gave a very strong yellow color which exhibited no migration into adjacent white rubber. It is represented by the formula:

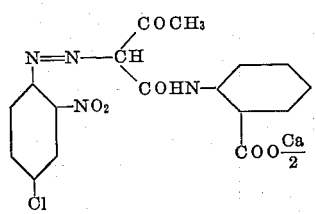

An advantage of the invention is in the manufacture by technically and economically satisfactory methods of new and superior colors. These colors are strong, non-migrating, light-fast, yellow colors of the azo class. These colors appear to be of the greatest commercial value in the form of their alkaline earth salts, but they also have utility in the form of the free acid and of other metal salts.

The compounds of this invention are greatly superior in light fastness and stability in oil to similar colors made from the para compound of the prior art. In each of the above examples, for instance, the substitution of the para for the ortho component produces an inferior dye. That the ortho compound should produce a color superior to the para is most unexpected and surprising.

As many apparently widely different embodiments of this invention may be made without departing from the spirit and scope thereof, it is to be understood that I do not limit myself to the specific embodiments thereof except as defined in the appended claims.

I claim:

1. A compound represented in the form of the free acid by the formula:

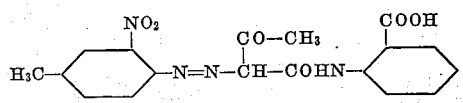

2. A compound represented in the form of its free acid by the formula:

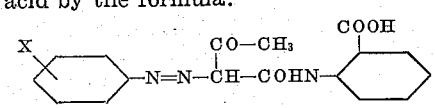

X being one of a group consisting of halogen, nitro, carboxy, and sulfonic acid.

3. The compound represented by the formula:

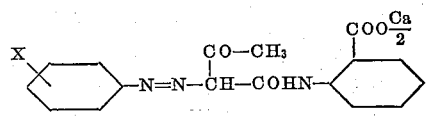

X being one of a group consisting of halogen, nitro, carboxy, and sulfonic acid.

4. The compound represented in the form of its free acid by the formula:

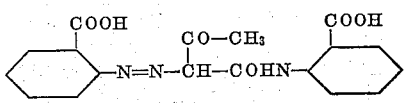

5. The process which comprises coupling diazotized 3-nitro-4-amino-toluene to aceto-acetyl-anthranilic acid, dissolving the product in alkaline water at 80° C., admixing therewith calcium chloride aqueous solution, and isolating the dye.

6. The process which comprises coupling diazotized 3-nitro-4-amino-toluene to aceto-acetyl-anthranilic acid, reacting the product with calcium chloride solution and isolating the dye.

7. The process which comprises coupling diazotized 3-nitro-4-amino-toluene to aceto-acetyl-anthranilic acid and reacting the product with a calcium-yielding compound.

8. The process which comprises coupling a diazotized aniline having at least one substituent from the group consisting of halogen, nitro, carboxy, and sulfonic acid to aceto-acetyl-anthranilic acid, and reacting the product with a calcium-yielding compound.

9. The process which comprises coupling an aniline having at least one substituent from the group consisting of halogen, nitro, carboxy, and sulfonic acid to aceto-acetyl-anthranilic acid, and reacting the product with a compound capable of yielding an alkaline earth metal.

10. The process which comprises coupling diazotized 3-nitro-4-amino-toluene to aceto-acetyl-anthranilic acid.

11. The compound represented by the formula:

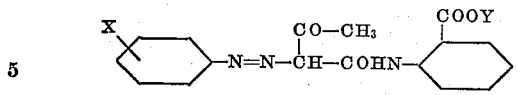

X being one of a group consisting of halogen, nitro, carboxy, and sulfonic acid, and Y being one of a group consisting of hydrogen and an alkaline earth metal.

12. The compound represented by the formula:

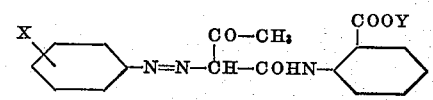

X being one of a group consisting of halogen, nitro, carboxy, and sulfonic acid, and Y being one of a group consisting of hydrogen and a metal.

CRAYTON K. BLACK.